(12) United States Patent
Naftali et al.

(10) Patent No.: US 11,825,328 B2
(45) Date of Patent: *Nov. 21, 2023

(54) POWER SAVING MEDIUM ACCESS IN CONGESTED NETWORK ENVIRONMENTS

(71) Applicant: TEXAS INSTRUMENTS INCORPORATED, Dallas, TX (US)

(72) Inventors: Oran Naftali, Petah Tikva (IL); Uri Weinrib, Iod (IL); Oren Shani, Kfar Saba (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/502,337

(22) Filed: Oct. 15, 2021

(65) Prior Publication Data

US 2022/0038938 A1    Feb. 3, 2022

Related U.S. Application Data

(63) Continuation of application No. 15/816,731, filed on Nov. 17, 2017, now Pat. No. 11,178,566.

(51) Int. Cl.
*H04W 28/02* (2009.01)
*H04W 52/02* (2009.01)
(Continued)

(52) U.S. Cl.
CPC ... *H04W 28/0221* (2013.01); *H04W 28/0278* (2013.01); *H04W 52/0216* (2013.01);
(Continued)

(58) Field of Classification Search
CPC ......... H04W 28/0221; H04W 28/0278; H04W 52/0216; H04W 52/0229; H04W 52/0235;
(Continued)

(56) References Cited

U.S. PATENT DOCUMENTS

| 8,005,032 B2 | 8/2011 | Wang et al. |
| 2013/0235720 A1 | 9/2013 | Wang et al. |

(Continued)

FOREIGN PATENT DOCUMENTS

CN          104160757 A     11/2014

*Primary Examiner* — Peter Chen
(74) *Attorney, Agent, or Firm* — Mandy Barsilai Fernandez; Frank D. Cimino

(57) ABSTRACT

A Wi-Fi device in a WLAN network includes a processor and a transceiver adapted to be coupled to an antenna, and a power saving medium access in congested network environments algorithm that is activated after a Wi-Fi connection is established with its access point (AP). A Traffic Indication Map (TIM) bitmap in a TIM information element received in a beacon frame from the AP is analyzed to determine whether more than a predetermined number of bits (X) are set to indicate the AP has $\geq 1$ buffered frame for ones of the Wi-Fi devices to conclude whether the WLAN is in a congested environment. When in a congested environment, transmissions responsive to the beacon are postponed by entering a sleep mode for a random period of time (P). After P expires, the sleep mode is exited and a poll frame is transmitted to the AP to try to gain medium access.

17 Claims, 3 Drawing Sheets

(51) Int. Cl.
*H04W 74/00* (2009.01)
*H04W 74/08* (2009.01)
*H04W 84/12* (2009.01)

(52) U.S. Cl.
CPC ..... *H04W 52/0229* (2013.01); *H04W 74/004* (2013.01); *H04W 74/0841* (2013.01); *H04W 74/006* (2013.01); *H04W 84/12* (2013.01)

(58) Field of Classification Search
CPC .......... H04W 72/0446; H04W 74/004; H04W 74/006; H04W 74/06; H04W 74/04; H04W 84/12
See application file for complete search history.

(56) References Cited

U.S. PATENT DOCUMENTS

| | | |
|---|---|---|
| 2013/0235773 A1 | 9/2013 | Wang et al. |
| 2014/0244768 A1 | 8/2014 | Shuman et al. |
| 2015/0098374 A1 | 4/2015 | Homchaudhuri et al. |
| 2015/0103767 A1 | 4/2015 | Kim et al. |
| 2016/0227534 A1* | 8/2016 | Kim .................... H04W 74/006 |
| 2016/0234756 A1* | 8/2016 | Alanen ................. H04W 74/08 |
| 2016/0337968 A1 | 11/2016 | Park et al. |
| 2016/0353378 A1 | 12/2016 | Kim et al. |
| 2017/0164285 A1 | 8/2017 | Tata |

\* cited by examiner

POWER SAVING MEDIUM ACCESS IN CONGESTED NETWORK ENVIRONMENTS

CROSS-REFERENCE TO RELATED APPLICATIONS

This application is a continuation of U.S. patent application Ser. No. 15/816,731 filed on Nov. 17, 2017, now issued as U.S. Pat. Ser. No. 11,178,566, which is incorporated herein by reference in its entirety.

FIELD

Disclosed embodiments relate generally to the field of wireless local area network (WLAN) communications, more specifically to power saving channel access for a WLAN device's communications with its access point.

BACKGROUND

Wi-Fi as known in the art is a wireless technology which uses radio waves to connect devices to the Internet wirelessly, that is generally based on the Institute of Electrical and Electronics Engineers (IEEE) 802.11 specification. This IEEE specification is currently the IEEE 802.11b/g/n which operates wirelessly in a band at 2.4 GHz or 5 GHz, where the IEEE 802.11 family shares the same basic protocol. IEEE 802.11 provides a set of media access control (MAC, or Data Link) layer and physical (PHY) layer specifications for implementing WLAN communications. The PHY layer and MAC layer reside in the Open Systems Interconnection (OSI) stack or the OSI 7 layer model, where layer-1 is known as the PHY layer and layer-2 is known as the MAC layer. Wi-Fi is a key technology enabling wireless devices to connect directly to one another, to wide area networks, or simply to the Internet in order to provide remote monitoring and control of a system. As such, Wi-Fi is becoming a major driver in the rapid expansion of the Internet of Things (IOT).

A Wi-Fi (ready) device means the device is ready for use in a WLAN. Such Wi-Fi devices can range from desktop computers, laptops, notebooks, smartphones, to other small devices. Power conservation is generally an important consideration for Wi-Fi devices which are typically battery powered. One common WLAN use case used by battery operated devices is a Wi-Fi enabled sensor network setup. The WLAN includes multiple Wi-Fi enabled sensors/actuators that are associated with a wireless router functioning as an Access Point (AP) through which the Wi-Fi device nodes (or 'stations') are connected to Internet. The Wi-Fi device enables Wi-Fi, connects to the WLAN, transmits/receives data, and in a sleep-mode significantly reduces its power consumed by turning off its modem, or in some cases turning off essentially the entire Wi-Fi device for a short duration to a long duration thus entering a sleep period where the Wi-Fi device is also disconnected from their AP until the next communication cycle begins.

The increased deployment of IEEE 802.11 device nodes sharing the same medium can lead to excessive load or congestion in WLAN networks. Currently the average WLAN network has about 10 connected Wi-Fi devices which is expected to increase to about 50 connected devices by 2020. For contention based channel access, all devices currently follow for the traditional Enhanced Distributed Channel Access (EDCA) approach whether or not the channel is congested.

One of the direct impacts of WLAN congestion is the increased time it takes a Wi-Fi device to transmit a frame after wakeup from sleep responsive to receiving a beacon frame from its AP. The more Wi-Fi device nodes there are in the network the longer it takes the device to gain medium access and the probability of congestion is increased (congestion being where two or more devices nodes transmit simultaneously). The time it takes a device to gain medium access is exponentially related to the number of connected Wi-Fi device nodes in the network. As a result of an increased number of connected Wi-Fi device nodes in the network, a Wi-Fi device may find itself in a congested environment making it stay active for a longer period of time. As a result, the device will be consuming more energy, which is particularly significant for battery operated Wi-Fi devices because device nodes powered by a battery experience an operational lifetime that can be reduced dramatically.

For example, assume a conventional WLAN network includes an AP serving 50 Wi-Fi devices, where the AP has data for each of the 50 Wi-Fi devices. In an example scenario using conventional EDCA assuming a data frame length of 1,500 bytes and a transmission data rate is 26 Mbps, the last Wi-Fi device in the network, device number 50, will be served with its data by the AP 28 milliseconds (ms) after the beacon frame transmitted by the AP wakes up the respective sleeping Wi-Fi devices.

SUMMARY

This Summary is provided to introduce a brief selection of disclosed concepts in a simplified form that are further described below in the Detailed Description including the drawings provided. This Summary is not intended to limit the claimed subject matter's scope.

In one disclosed aspect, a Wi-Fi device for operation in a WLAN network collectively including a plurality of Wi-Fi devices includes a processor with a memory and a transceiver coupled to the processor adapted to be coupled to an antenna, and a power saving medium access in congested network environments algorithm that is activated after a Wi-Fi connection is established with its AP. A Traffic Indication Map (TIM) bitmap in a TIM information element received in a beacon frame from the AP is analyzed to determine whether the AP currently has at least one buffered frame for ones of the Wi-Fi devices to conclude whether the WLAN is a congested environment. When in a congested environment, transmissions responsive to the beacon frame are postponed by entering the device into a sleep mode for a random period of time (P). After P expires, the sleep mode is exited and a frame is transmitted to the AP to try to gain medium access to the AP.

BRIEF DESCRIPTION OF THE DRAWINGS

Reference will now be made to the accompanying drawings, which are not necessarily drawn to scale, wherein.

DETAILED DESCRIPTION

Figure 1:
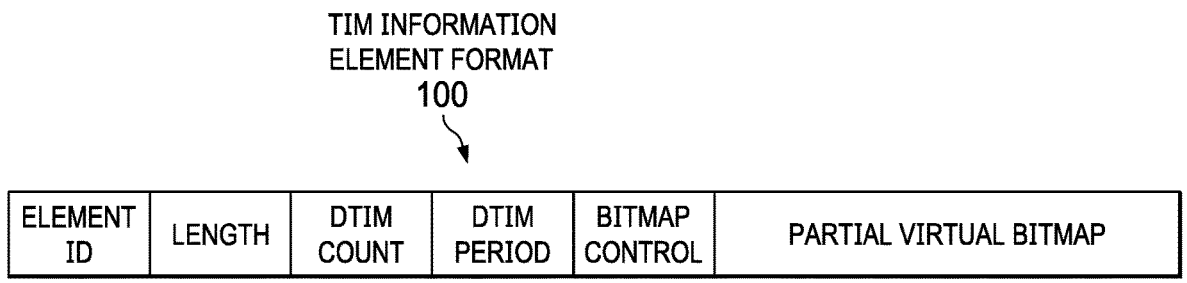
FIG. 1 shows the format for a conventional TIM information element of a beacon frame for a TIM information element having a partial virtual bitmap.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

Disclosed embodiments recognize in WLAN networks the AP transmits a beacon frame to the Wi-Fi devices in the network sometimes referred to as Wi-Fi device stations every fixed time interval. A parameter called the Target Beacon Transmission Time (TBTT) is the time when beacons are sent by the AP periodically. The Beacon interval field represents the number of time units (TU) between TBTTs, where the default value is currently 100 TU (102.4 ms). In its idle (or sleep) state, a conventional Wi-Fi device is programmed to receive only beacon frames. Between beacon frames the Wi-Fi device may enter a power save (or sleep) mode.

While the Wi-Fi device is in the sleep mode the AP buffers all packets destined to that Wi-Fi device and sets the traffic indication virtual bitmap bit representing the device association ID (AID) in the TIM information element of the beacon frame to indicate that data packets have been queued. Every connected Wi-Fi device has its own dedicated bit in the traffic indication virtual bitmap field in the TIM information element representing its AID that it uses to determine from the beacon frame whether the AP has any buffered data frames present for it. These dedicated bits are collectively generally referred to as a TIM bitmap.

For example, under the IEEE 802.11 standard the TIM information element allows the AP to transfer 1 8-bit byte up to the entire 251 bytes (2,008 bits) of the TIM information element, including allowing an AP to transmit a smaller TIM bitmap (less than one bit for each device) when it is expected that only a few of the Wi-Fi devices will be currently asleep. Because of this feature the bitmap values passed in the TIM information element by the AP is generally called a partial virtual bitmap that represent only those network Wi-Fi devices currently in a sleep mode for which AP has traffic buffered, which can generally be 1 to 251 bytes long.

A particular Wi-Fi device may have several different modes of sleep, all being reduced power (typically all shutting down their modem) compared to the power expended during active mode operation. After beacon reception every Wi-Fi device in the network that finds its corresponding bit in the partial virtual bitmap of the TIM information element to be high starts to compete to gain medium access with the other Wi-Fi devices in the network. As described above, the more Wi-Fi devices there are in the network the more time it will take to pull all the queued data packets received in frame(s) from the AP, where each frame can contain one or more data packets depending on the network medium. As a result a Wi-Fi device in a congested network environment stays in the active mode for a longer period of time and thus consumes more energy. This congestion leading to a longer active mode time can significantly reduce the lifetime of battery operated Wi-Fi devices (see FIG. 5 described in the Examples section described below).

Disclosed embodiments provide an energy efficient method for Wi-Fi devices pulling packets from the AP after beacon reception in congested network environment which reduces the amount of energy consumed by the Wi-Fi device and thus significantly decreases the impact on device's lifetime when it is battery powered. In disclosed methods, after beacon reception the Wi-Fi device will monitor the entire TIM bitmap that is generally a partial virtual bitmap to gain insight into the current network density by determining the number of Wi-Fi devices currently in the sleep mode for which the AP has traffic buffered for them. If the TIM bitmap in the beacon signal indicates there is currently more than a predetermined number (X value) of Wi-Fi devices to pull queued data packets from the AP, disclosed Wi-Fi devices will suspend their transmission of their power save (PS)-poll frame which conventionally follows essentially immediately after the beacon frame.

The Wi-Fi device will instead enter a sleep mode for a random period of time (P), such as between 20 ms and 40 ms, in order to avoid collisions with other Wi-Fi devices that are trying to also pull data packets from the same AP at the same time. When P expires the Wi-Fi device will exit the sleep mode and will try to pull the queued data packets from the AP by initiating the pulling by only then sending a PS-poll frame. This delayed data pulling during periods of congestion will reduce the Wi-Fi device active time penalty due to a busy medium and contention window (CW) size enlargement in case of collisions.

Disclosed embodiments include Wi-Fi device power saving medium access in congested network environments algorithms that analyze the TIM information element in the beacon frame from the AP to discover if the medium is going to be congested or not, and to act accordingly. In a congested environment, the disclosed algorithm will postpone transmissions and the Wi-Fi device will instead enter a sleep mode for a random period of time (e.g. >10 ms, such as between 20 ms and 40 ms) in order to avoid collisions with other Wi-Fi device trying to transmit packets to the AP at the same time. This way a Wi-Fi device running a disclosed algorithm will save energy.

FIG. 1 shows the format for a conventional TIM information element 100 of a beacon frame for a TIM information element having a partial virtual bitmap. The TIM information element 100 can be seen to include fields including an element ID, a length, a delivery traffic indication map (DTIM) count, a DTIM period, a bitmap control, and a partial virtual bitmap. As described above, the partial virtual bitmap represents the network devices in sleep mode for which AP has traffic (data) buffered. TIM information element 100 allows an AP to transfer 1 byte up to the entire TIM such as 251 bytes (2,008 bits), generally allowing an AP to transmit a smaller partial virtual bitmap (less than one bit for each network device) when it is expected that only a relatively small percentage (a few) of the devices in the network will currently be asleep.

Figure 2:
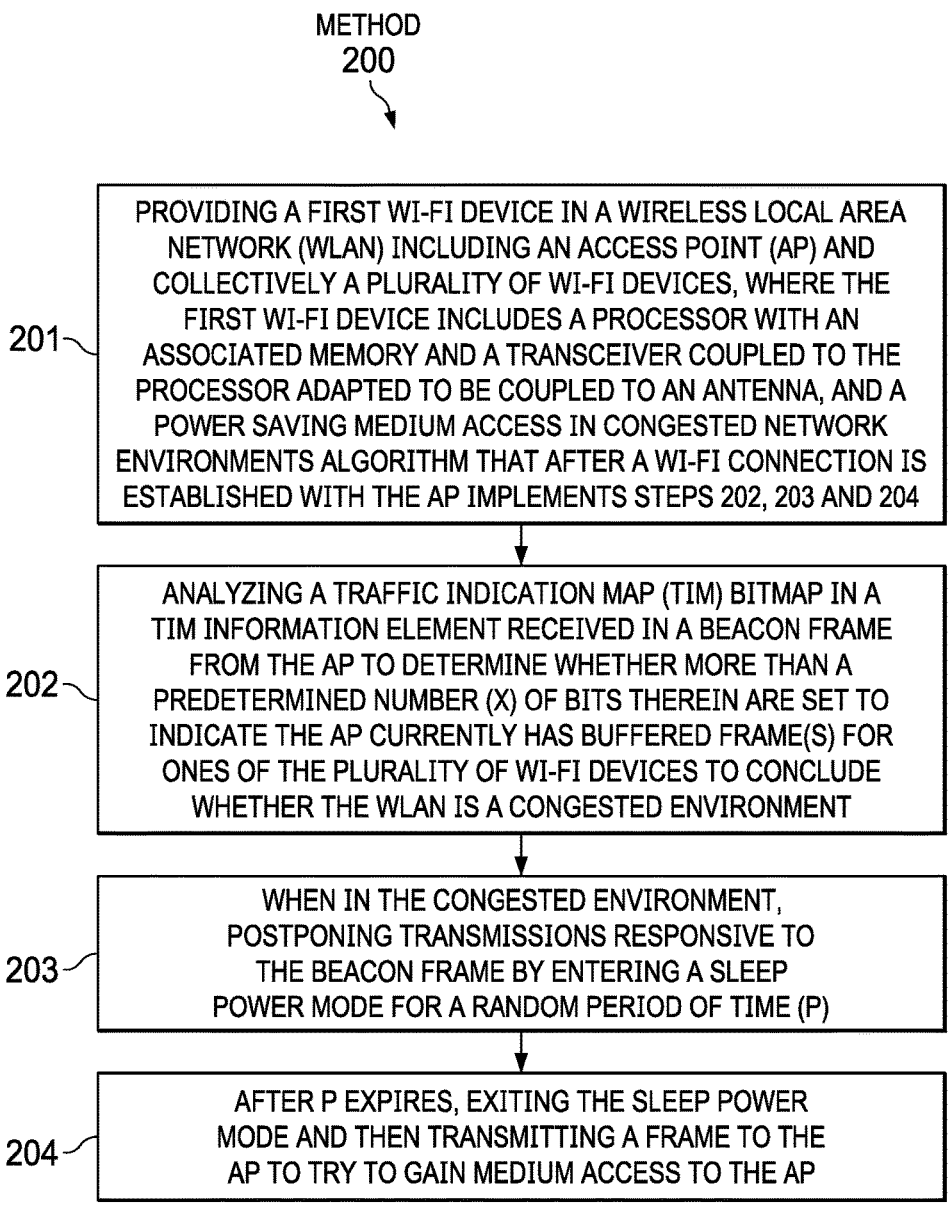
FIG. 2 is a flowchart showing steps for an example method of Wi-Fi device power saving medium access in congested network environments, according to an example embodiment.

FIG. 2 is a flowchart for an example method 200 of Wi-Fi device power saving medium access in congested network environments, according to an example embodiment. Step 201 comprises providing a first Wi-Fi device in a WLAN including an AP and collectively a plurality of Wi-Fi devices. The first Wi-Fi device includes a processor with an associated memory and a transceiver coupled to the processor adapted to be coupled to an antenna, and a power saving medium access in congested network environments algorithm that after a Wi-Fi connection is established with the AP implements steps 202, 203 and 204.

Step 202 comprises analyzing a TIM bitmap in a TIM information element received in a beacon frame from the AP to determine whether more than a predetermined number (X) of bits therein are set to indicate the AP currently has at least one buffered frame for ones of the plurality of Wi-Fi devices to conclude whether the WLAN is a congested environment. Step 203 comprises wherein when in the congested environment, postponing transmissions responsive to the beacon frame by entering a sleep mode for a random period of time (P). For example, as disclosed above, P can be at least 10 ms, such as between 20 ms and 40 ms, in order to avoid collisions with other Wi-Fi devices trying to transmit packets to the AP at the same time. As described above, if it is determined that the WLAN is currently not operating in a congested environment (e.g., ≤X bits are set), first Wi-Fi device does not enter a sleep mode and instead transmits a PS-poll frame to the AP after immediately after receiving the beacon frame.

Step 204 comprises after P expires, the first Wi-Fi device exits the sleep mode and then transmits a PS-poll frame to the AP to try to gain medium access to the AP, generally following the EDCA methodology. The X value can be determined by software according to particular system requirements. P is generally based on the X value plus a random backoff (BO) time, such as in the example equation for P described below.

The Wi-Fi devices in the WLAN including the first Wi-Fi device can be exclusively powered by a battery and can include a sensor coupled to its processor. The parameter P can be determined by an equation that includes a number of Wi-Fi devices in the WLAN waiting to pull data from the AP (Nsta). The equation can comprise:

$$P = Nsta*Tdata + Z*S + BO$$

where:
Tdata is a time for data frame pulling. Tdata generally depends on the frame length and frame transmission rate. Z is random number such as being between 0 and 31 so that Wi-Fi devices in the WLAN implementing this method will not collide. S is a space-time constant time, such as 0.5 ms, and BO is a constant time which can be the EDCA BO time.

Figure 3:
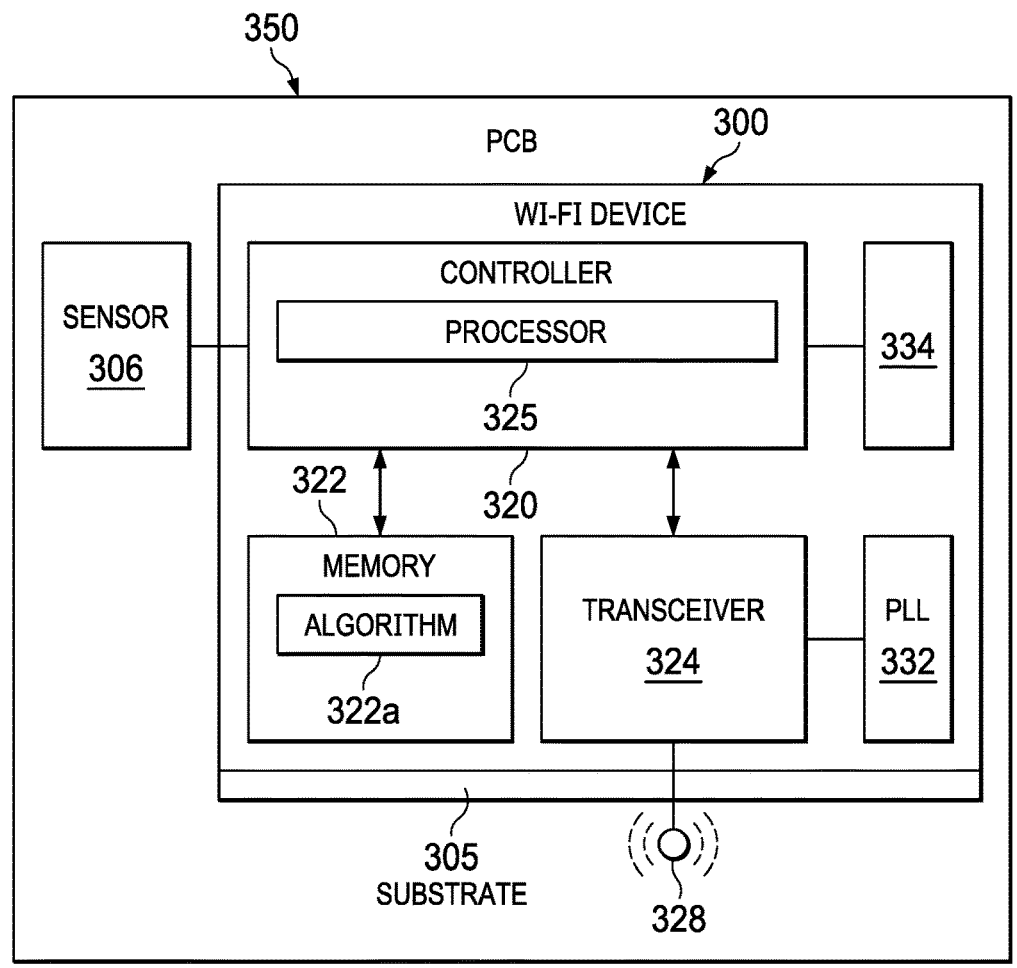
FIG. 3 shows an example Wi-Fi device that can implement disclosed methods of power saving medium access in congested network environments.

FIG. 3 is a system block diagram representation of an example Wi-Fi device 300 that generally conforms to the IEEE 802.11 communications standard that is configured to implement disclosed power saving medium access in congested network environments methods. The Wi-Fi device 300 is shown formed as an integrated circuit (IC) on a substrate 305 that has a semiconductor surface (e.g., a silicon substrate), wherein the processor 325 comprises a digital signal processor (DSP), a microcontroller, an application specific integrated circuit (ASIC), a general processor, or any other combination of one or more integrated processing devices. One or more sensors 306 are shown optionally coupled to the Wi-Fi device 300 shown being on the same printed circuit board (PCB) 350 for interacting with the physical world. The sensor(s) may also be formed on the substrate 305.

The Wi-Fi device 300 communicates in a Wi-Fi network sometimes referred to as being a WLAN network. The Wi-Fi device comprises a controller 320 including the processor 325, a memory 322 including software code stored in the memory for implementing a disclosed power saving medium access in congested network environments algorithm 322a, and a transceiver 324 that is coupled to the processor 325 and to an antenna 328. The memory 322 is more generally configured to store information including data, instructions, or both. The memory 322 may be any storage medium accessible by the controller 320, such as a read only memory (ROM), a random access memory (RAM), a register, cache memory, or magnetic media device such as internal hard disks and removable disks. A phase lock loop (PLL) 332 is also provided for purposes including signal mixing and frequency synthesis.

The Wi-Fi device 300 is also shown including hardware comprising digital logic 334 that can also be provided for implementing a disclosed power saving medium access in congested network environments algorithm. However, as noted above, the power saving medium access in congested network environments algorithm 322a as shown in FIG. 3 may also be implemented by software stored in a memory such as memory 322 by the processor 325.

The controller 320 is coupled to the memory 322 and to the transceiver 324. In some implementations, the transceiver 324 comprises baseband units (not shown) and analog units (not shown) to transmit and receive RF signals. The baseband unit may comprise hardware to perform baseband signal processing including digital signal processing, coding and decoding, modulation, and demodulation. The analog unit may comprise hardware to perform analog to digital conversion (ADC), digital to analog conversion (DAC), filtering, gain adjusting, up-conversion, and down-conversion. The analog unit may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer to up-convert the baseband signals and down-convert the RF signals with a carrier signal oscillated at a radio frequency of the WLAN system. The radio frequency may be 2.4 GHz or 5 GHz utilized in WLAN systems conforming to 802.11a/b/g/n/ac specifications, or other specifications depending on future radio access technology.

Figure 4A:
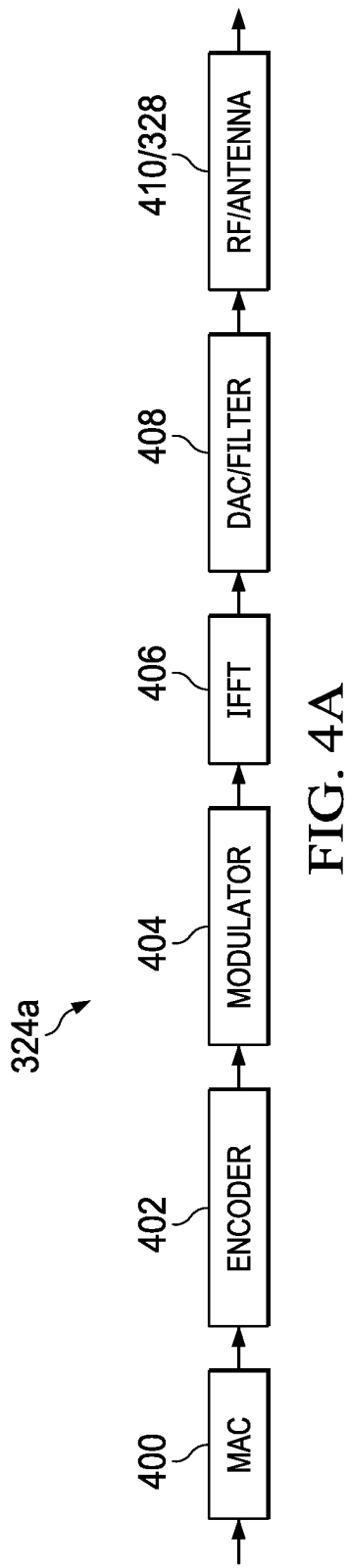
FIG. 4A is a block diagram of an example transmitter for a disclosed Wi-Fi device, according to an example embodiment.

FIG. 4A is a block diagram of an example transmitter 324a portion of the transceiver 324 shown in FIG. 3. The transmitter 324a is shown comprising a MAC module 400, an encoder 402, a modulator 404, an Inverse Fast Fourier Transform (IFFT) module 406, a DAC/filter module 408, and an RF module 410 including an antenna 328. The transmitter 324a can produce outgoing RF signals in one or more frequency ranges to be transmitted over one or more communication channels. The frequency range can include a group of OFDM sub-carriers.

The MAC module 400 may include one or more MAC control units (MCUs) to produce and pass MAC Protocol Data Units (MPDU), corresponding preamble and header data streams to the encoder 402, which may perform Forward Error Correction encoding thereto to produce respective encoded data stream. Forward Error Correction (or channel coding) adds redundant data providing error control for data transmission to a message to be transmitted. The FEC codes may be a block code or a convolutional code. The block code comprises a fixed size block of symbols. The convolutional code comprises symbol streams of predetermined or arbitrary length. The modulator 404 performs modulation schemes on the encoded data streams according to the data type to produce modulated data streams to the IFFT module 406. The modulation schemes can comprise, for example, Phase-Shift Keying (PSK), a Frequency Shift Keying (FSK), an Amplitude Shift Keying (ASK), or Quadrature Amplitude Modulation (QAM).

The IFFT module 406 can further include an OFDMA module, where the OFDMA module maps different modulated streams to different subcarrier groups before IFFT processing. In some implementations, the IFFT module 406 may perform an IFFT on outputs of the modulator 404 to generate one or more time domain signals associated with one or more frequency range. In some implementations, the IFFT module 406 can be configured to use one or more Fast Fourier Transform (FFT) bandwidth frequencies such as 20 MHz, 40 MHz, 80 MHz, or 160 MHz. In some implementations, the IFFT module 406 may perform different IFFTs on the modulated data streams according to different FFT bandwidths. Next, the DAC/filter module 408 converts the time domain signal to an analog signal and shapes the analog signal for transmission via an RF module 410 that includes an antenna 328. The RF module 410 comprises one or more up converters (not shown) that up-convert the analog signals to corresponding frequency bands for the transmitter antenna to perform transmission.

Figure 4B:
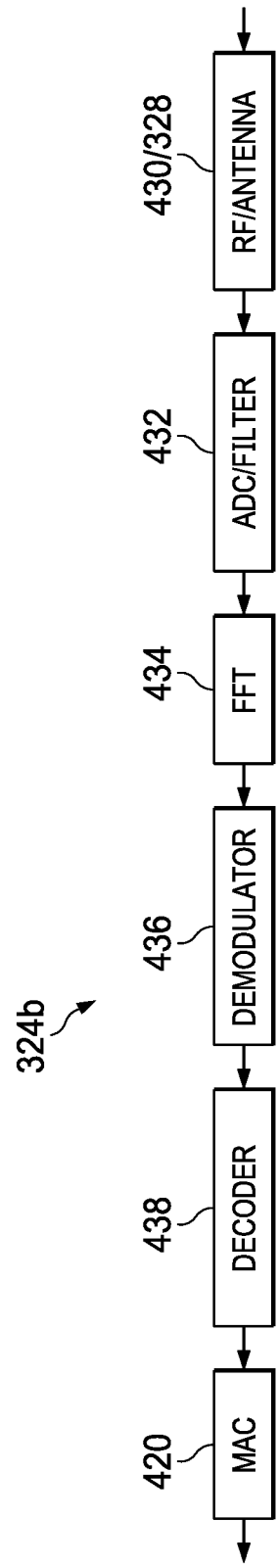
FIG. 4B is a block diagram of an example receiver for a disclosed Wi-Fi device, according to an example embodiment.

FIG. 4B is a block diagram of an example receiver 324b portion of the transceiver 324 shown in FIG. 3. The receiver 324b comprises an RF module 430 including an antenna 328, an ADC/filter unit 432, a FFT unit 434, a demodulator 436, a decoder 438, and a MAC module 420. The RF module 430 including an antenna 328 is coupled to the ADC/filter unit 432, the FFT unit 434, the demodulator 436, the decoder 438, and then to the MAC module 420.

In operation the receiver 324b receives incoming RF signals in one or more frequency ranges over one or more communication channels. The frequency range can include a group of OFDM sub-carriers. The receiver 324b performs signal processing to process received data packets in a reverse order to the transmitter 324a to recover the information therein. The receiver 324b is generally capable of detecting a data type of various WLAN generation signals including IEEE 802.11a/b/g (legacy), IEEE 802.11n, IEEE 802.11ac, or a future WLAN generation based on the signal field in the received data packet.

The RF module 430 including antenna 328 retrieves the incoming signal comprising the physical layer convergence procedure (PLCP) protocol data unit (PPDU), and performs down-conversion. The ADC/filter unit 432 filters the down-converted signal and transforms which into digital data sequence. The FFT unit 434 transforms the digital data sequence to a frequency domain data sequence. The demodulator 436 determines the modulation type of the symbols in the frequency domain data sequence, thereby determining the WLAN generation of the received data, and demodulates the payload data field.

In some examples, a Wi-Fi device that implements a power saving medium access in congested network environments algorithm according to this disclosure may enter a sleep mode immediately after beacon reception from the AP when it determines congestion is present instead of staying in the active mode and trying to pull its queued packets from the AP by sending a PS-poll frame responsive to the beacon frame.

EXAMPLES

Disclosed embodiments are further illustrated by the following specific Examples, which should not be construed as limiting the scope or content of this Disclosure in any way.

As described above, disclosed Wi-Fi device power saving medium access in congested network environments algorithms may extend battery lifetime by reducing the device power consumption in network congested environments. The benefit obtained in energy saving may depend on the number of connected Wi-Fi devices in the network. This energy savings calculated example described below assumes each Wi-Fi device in the WLAN receives a data frame of 1,500 Bytes @26 Mbps (MCS3) from the AP every minute.

Figure 5:
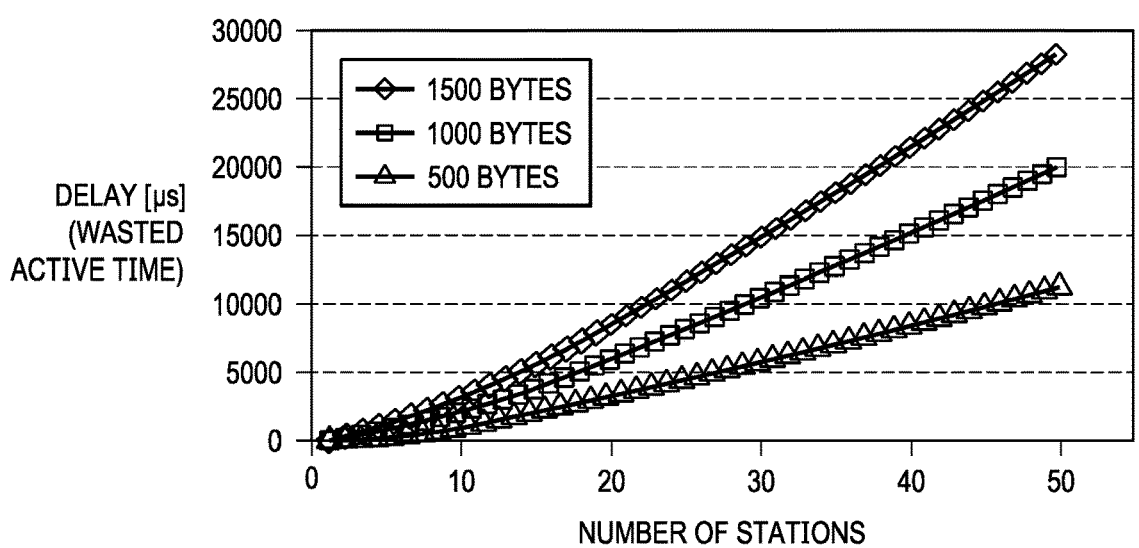
FIG. 5 shows a simulated plot of delay time (in µs) vs the number of Wi-Fi devices in the WLAN going up to 50 Wi-Fi devices.

FIG. 5 shows a simulated plot of delay time (in μs) vs. the number of Wi-Fi devices (shown as "stations") in the WLAN going up to 50 Wi-Fi devices. Delay time data is shown for the Wi-Fi devices receiving a data frame of 1,500 Bytes at 26 Mbps (MCS3), as well as 1,000 Bytes and 500 bytes, from the AP every minute. The delay time is measured as the time after the beacon frame is sent by the AP. During the delay time the Wi-Fi device is expending significant energy being in active mode (its modem is on) waiting for its packets from the AP, so that as the delay time increases, the energy expended by the Wi-Fi device increases linearly.

For a data frame of 1,500 Bytes at 26 Mbps (MCS3), with 10 connected Wi-Fi devices the energy saving for the Wi-Fi device will be ~5%. With 20 connected Wi-Fi devices again using MCS3, the energy saving will be ~13%. With 30 connected Wi-Fi devices again using MCS3 the energy saving will be ~23%. With 50 connected Wi-Fi devices again using MCS3 the energy saving will be ~55%. Wi-Fi device energy savings provided by disclosed power saving medium access in congested network environments algorithms is a very important feature for the IoT industry because most IOT products run only on battery power.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

The invention claimed is:

1. A method comprising:
   receiving, by a wireless device, a beacon frame;
   determining, by the wireless device, a number of waiting devices associated with a network, wherein each of the number of waiting devices is waiting for a respective data; and
   in response to the number of waiting devices being greater than a threshold, delaying, by the wireless device, transmission of a poll frame by a delay time, wherein the delay time is based on the number of waiting devices associated with the network, a backoff time, a random number, a frame length, and a frame transmission rate associated with the poll frame.

2. The method of claim 1, wherein:
   the determining the number of waiting devices associated with the network is based on bits in a traffic indication map.

3. The method of claim 1, further comprising:
in response to receiving the beacon frame, determining, by the wireless device, a data waiting status for the wireless device from the beacon frame.

4. The method of claim 1, wherein:
the delay time is a random time between 20 milliseconds (ms) and 40 ms.

5. The method of claim 1, wherein the random number is based on a product of a further random number and a fixed number.

6. The method of claim 5, wherein the further random number is a value between 0 and 31.

7. A device comprising:
a transceiver; and
a processing unit coupled to the transceiver and configured to:
  receive a beacon frame;
  determine a number of waiting devices associated with a network, wherein each of the number of waiting devices is waiting for a respective data; and
  in response to the number of waiting devices being greater than a threshold, delaying transmission of a poll frame by a delay time, wherein the delay time is based on the number of waiting devices associated with the network, a backoff time, a random number, a frame length, and a frame transmission rate associated with the poll frame.

8. The device of claim 7, wherein the processing unit is further configured to:
determine the number of waiting devices associated with the network based on bits in a traffic indication map.

9. The device of claim 7, wherein the processing unit is further configured to:
determine, in response to receiving the beacon frame, a data waiting status from the beacon frame.

10. The device of claim 7, wherein:
the delay time is a random time between 20 milliseconds (ms) and 40 ms.

11. The device of claim 7, wherein the random number is based on a product of a further random number and a fixed number, and wherein the further random number is a value between 0 and 31.

12. A network comprising:
an access point configured to:
  buffer data for a plurality of devices coupled to the access point; and
  transmit a beacon frame; and
a first device of the plurality of devices configured to:
  receive the beacon frame;
  determine a number of the plurality of devices waiting for respective data; and
  in response to the number of the plurality of devices waiting for the respective data being greater than a threshold, delaying transmission of a first poll frame by a delay time, wherein the delay time is based on the number of waiting devices associated with the network, a backoff time, a random number, a frame length, and a frame transmission rate associated with the first poll frame.

13. The network of claim 12, wherein:
the beacon frame includes a respective data waiting bit in a traffic indication map for each of the plurality of devices for which the access point has buffered the respective data.

14. The network of claim 12, wherein the first device is further configured to, in response to the first device receiving the beacon frame, determine a data waiting status for the first from the beacon frame.

15. The network of claim 12, wherein:
the delay time is a random time between 20 milliseconds (ms) and 40 ms.

16. The network of claim 12, further comprising:
a second device of the plurality of devices configured to:
  receive the beacon frame;
  determine the number of the plurality of devices waiting for respective data; and in response to the number of the plurality of devices waiting for the respective data being less than the threshold, transmitting a second poll frame.

17. The network of claim 12, wherein the random number is based on a product of a further random number and a fixed number, and wherein the further random number is a value between 0 and 31.

* * * * *